United States Patent
Ebuchi

(10) Patent No.: US 8,136,110 B2
(45) Date of Patent: Mar. 13, 2012

(54) CONTINUE MONITORING PRINT JOB BASED ON JOB ID AND INFORMATION PRESENT IN THE PRINT QUEUE EVEN THOUGH NO PRINT JOB IS PRESENT IN THE PRINT QUEUE

(75) Inventor: Kazuhisa Ebuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 918 days.

(21) Appl. No.: 11/871,815

(22) Filed: Oct. 12, 2007

(65) Prior Publication Data

US 2008/0098396 A1 Apr. 24, 2008

(30) Foreign Application Priority Data

Oct. 24, 2006 (JP) ................. 2006-288811

(51) Int. Cl.
- *G06F 9/46* (2006.01)
- *G06F 3/12* (2006.01)
- *G06F 15/16* (2006.01)
- *G06F 15/173* (2006.01)
- *G06K 15/00* (2006.01)

(52) U.S. Cl. ...... 718/100; 358/1.15; 358/1.16; 709/203; 709/224; 709/225

(58) Field of Classification Search ............... None
See application file for complete search history.

(56) References Cited

U.S. PATENT DOCUMENTS

| 5,220,674 | A | * | 6/1993 | Morgan et al. ............... 709/223 |
| 5,832,301 | A |   | 11/1998 | Yamaguchi |
| 6,943,905 | B2 | * | 9/2005 | Ferlitsch ..................... 358/1.13 |
| 2002/0188646 | A1 | * | 12/2002 | Terrill et al. .................. 709/101 |
| 2004/0190014 | A1 | * | 9/2004 | Ferlitsch ........................ 358/1.5 |
| 2004/0263898 | A1 | * | 12/2004 | Ferlitsch ..................... 358/1.15 |
| 2004/0263899 | A1 | * | 12/2004 | Ferlitsch ..................... 358/1.15 |
| 2005/0128505 | A1 | * | 6/2005 | Shirai et al. ................. 358/1.14 |
| 2005/0128517 | A1 | * | 6/2005 | Sakamoto .................... 358/1.15 |
| 2006/0146360 | A1 |   | 7/2006 | Simonds et al. |

FOREIGN PATENT DOCUMENTS

| EP | 1435565 A2 | 7/2004 |
| JP | H09-146726 A | 6/1997 |
| JP | 2004-021692 A | 1/2004 |
| JP | 2004-348401 A | 12/2004 |

\* cited by examiner

*Primary Examiner* — Jennifer To
*Assistant Examiner* — Abdullah Al Kawsar
(74) *Attorney, Agent, or Firm* — Canon USA, Inc., I.P. Division

(57) ABSTRACT

A method in an information-processing apparatus for monitoring a job based on a print request from a client computer includes obtaining job information which exists in a print queue, continue monitoring the print queue based on the obtained information even if a client job corresponding to a print process in a client computer disappears from the print queue, and stopping monitoring a print queue when a server job corresponding to a print process in a server computer disappears from the print queue.

4 Claims, 8 Drawing Sheets

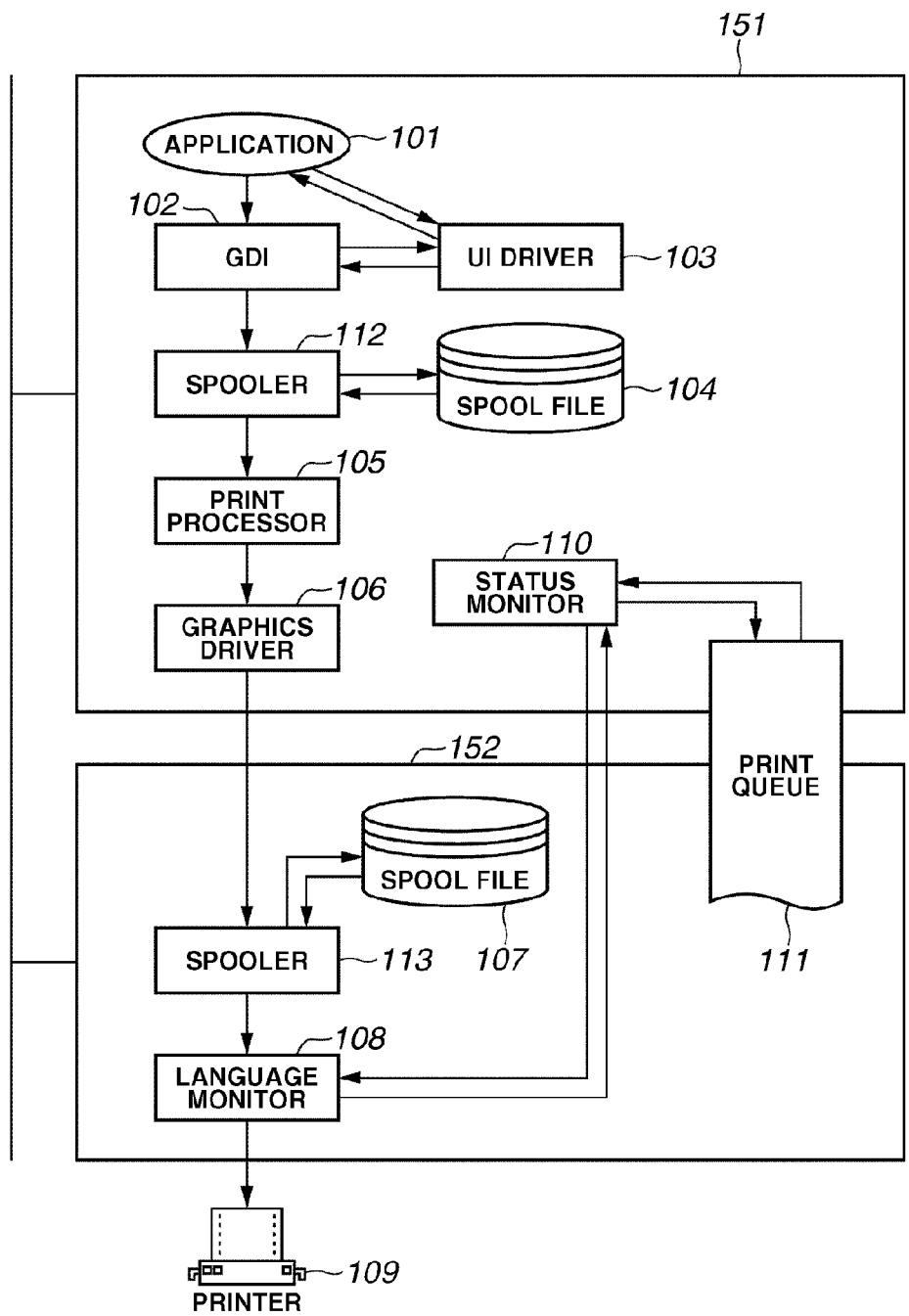

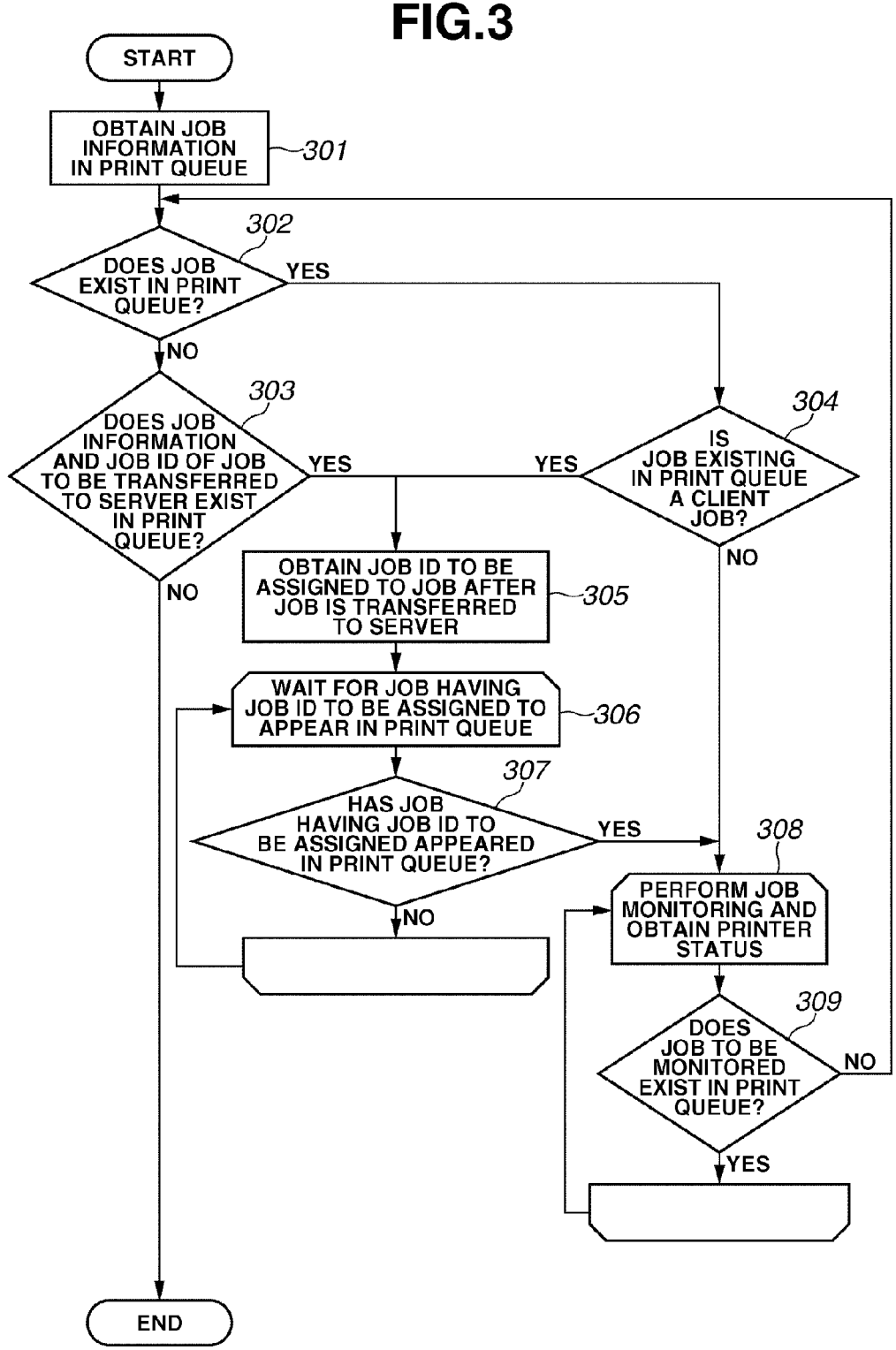

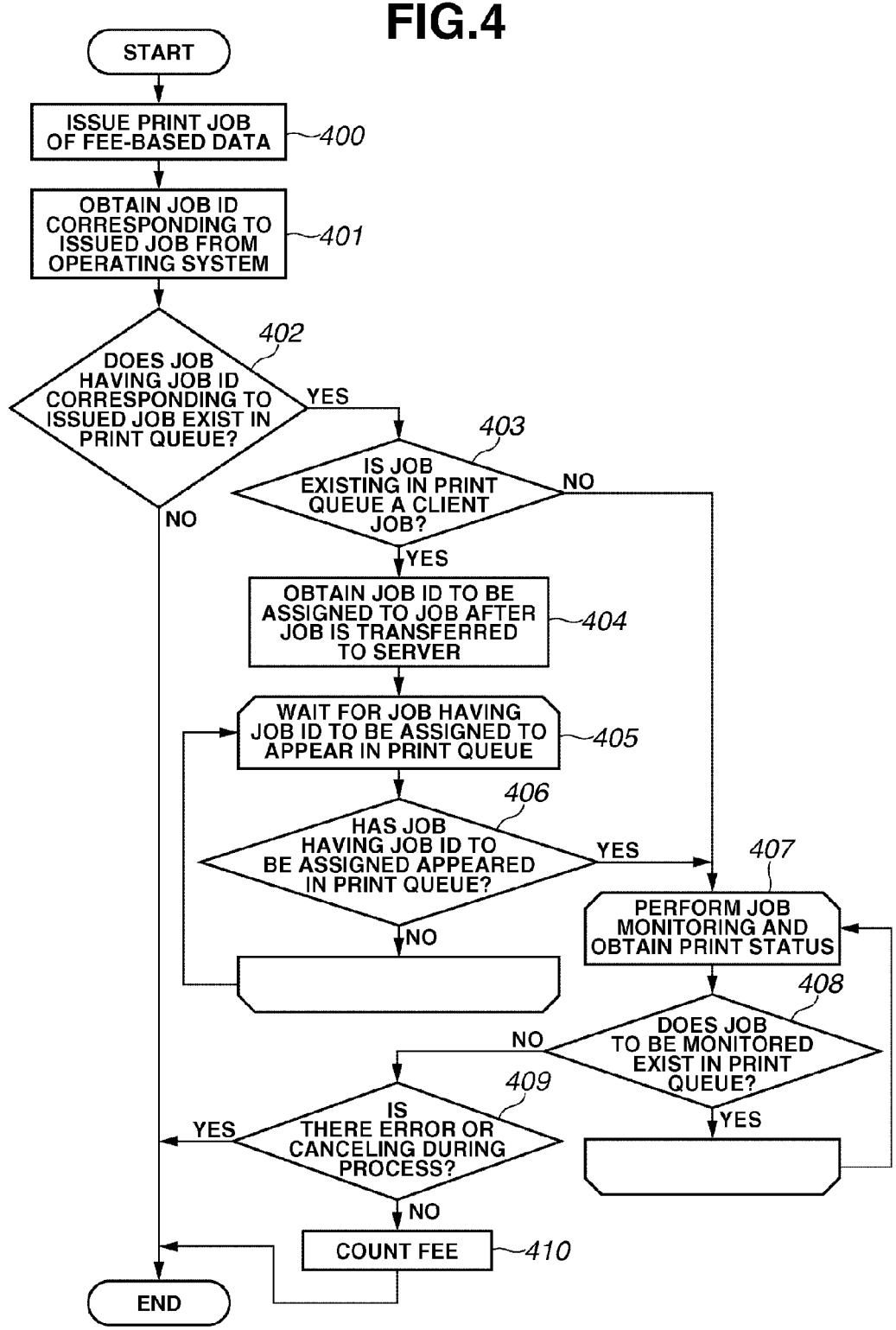

CONTINUE MONITORING PRINT JOB BASED ON JOB ID AND INFORMATION PRESENT IN THE PRINT QUEUE EVEN THOUGH NO PRINT JOB IS PRESENT IN THE PRINT QUEUE

BACKGROUND OF THE INVENTION

1. Field of the Invention

The present invention relates to a method of correctly monitoring status of a print job such as completion of a print process or existence of a job according to a print instruction from a client computer, and an apparatus thereof.

2. Description of the Related Art

When a printer performs printing, a method of monitoring the status of the print process based on the various operation statuses of the printer is employed. The various operation statuses include a normal status such as paper discharge, paper feeding, or printing, and an error status such as paper jam, or running out of ink. In addition to the above monitoring, there is also a method of monitoring the status of a print process based on the status of a print job which is input into a spooler corresponding to the printer. Such status of a print job includes spooling, despooling, and existence of a job.

In a print status monitoring system utilizing the above monitoring methods, the simplest method for detecting completion of a print process is to monitor the transition of the printer from a printing state to an idle state via paper discharge operation.

However, if the print job remains spooled inside a computer and thus is not transferred to the printer, the completion of the print process cannot be determined correctly by using a method which only monitors the operation status of the printer. Additionally, when a print queue, which is a waiting list of the print job, is placed on hold, the completion cannot be determined correctly by using the above method.

Moreover, in a method which only monitors the existence of a print job in the print queue inside a host computer, the printing is considered to be completed when data transfer to the printer is completed. Consequently, the printing is considered to be completed even in the case where printing is continued in the printer or the printing has stopped because of an error.

To solve the above problems, a print status monitoring system discussed in Japanese Patent Application Laid-Open No. 2004-21692 detects print completion more accurately based on the operation status of the printer and the existence of a print job in the print queue. More particularly, it is determined that the printer is not printing when the print job (i.e., monitor target) does not exist in the print queue and the printer is ready to print.

Furthermore, print completion can also be determined in collaboration with a process called a language monitor which is executed in the spool subsystem in operating systems such as Microsoft Windows® 2000 and Windows® XP. In a spool subsystem, print data is output after spooling the print data once.

The language monitor can transfer print data to a printer connected to the computer while communicating with the printer by two-way communication complying with Institute of Electrical and Electronic Engineers (IEEE) 1284, USB1.1, or Universal Serial Bus (USB) 2.0 standards.

After the language monitor transfers all of the print data to the printer and confirms that the printer has discharged the last page, the language monitor returns control to the spooler. Consequently, the job in the print queue disappears only after the printer outputs the last page without fail. Additionally, the print job in the print queue disappears if a user cancels the print job during the process.

Thus, a status monitor can monitor the status of the print process by communicating with a print queue and can determine that the print process has ended when the job disappears from the print queue. This method will be described below by referring to a printer network environment including an operating system such as Microsoft Windows® XP. In such a printer network environment, the status of a print job in a printing system including a print server computer (hereinafter, referred to as server) and a client computer (hereinafter, referred to as client) is monitored through one print queue. The status of the print job in a print process is thus obtained by monitoring a print queue which is shared by the server and the client, regardless of the process in the server or the client. In the present example, the print queue is retained in the server, and the status monitor is monitoring the print queue. Since the information of the job which is being processed in the client is also reflected in the print queue of the server, the client and the server share one print queue. A storage area which is actually the print queue can be included in either the client or the server, and information about the job processed in both the client and the server can be obtained by monitoring the status of the print queue.

FIG. 6 illustrates the relation between print processes in the server and the client, the job in the print queue shared by the server and the client, and monitoring of the status in the client of the system. The processing illustrated in FIG. 6 progresses in time from the upper part to the lower part.

In a client 601, a print job is issued from a given application in step 604, and in step 607, the status monitor is activated from a user interface (UI) driver 103 which is a software module inside a printer driver. The UI driver 103 will be described below in an embodiment.

After step 607 is finished, the status monitor 110 enters a status monitoring phase 608 and begins communications 610, 611, and 612 with a print queue 602 which is shared by the server 603 and the client 601. Through such communication, the status monitor obtains information about the existence of a print job in the print queue 602.

In step 606, the print job issued in step 604 is sent to the server 603.

In step 616, the server 603 starts receiving a print job sent from the client 601. At the same time, a print job 615 appears in the print queue 602.

In step 617, the server 603 executes the print job received in step 616. The execution of a print job includes a series of processes related to a print output process of a print job, such as rendering of a print job on the server or data transfer to the printer. Rendering is a process of generating an image from information about an object or a figure provided in the form of numerical data, by means of calculation.

The print job execution 617 continues in the server 603 until the print process in the printer is completed, according to a response from the printer. The print job 615 disappears from the print queue 602 when the print job execution 617 ends.

The status monitor 110 is in a monitoring phase 608 and continuing communication with the print queue 602. When the status monitor 110 detects through communication 613 that the job has completely disappeared from the print queue 602, the status monitor finishes processing and stops the status monitoring in step 609.

As described in FIG. 6, when printing is performed from a client, the print process exists as one job in a print queue throughout the process. The job exists in the print queue regardless of whether the print data actually exists in the client side or the server side. Therefore, the status monitor needs to monitor only one print queue in a client and in a server.

However, there are cases where conventional methods cannot detect print completion and print status in a printing system that include a spool sub system in a network environment.

There are print systems that perform rendering of a print job in a client when a client executes printing on a printer connected to a server. This process is known as client side rendering.

Client side rendering prevents the process load from concentrating on a server in a large-scale network. Additionally, client side rendering allows the client to use the function of previewing print results which a printer driver provides in the rendering process. Furthermore, by performing rendering in the client, the print job is completed within the client, and thus an independent print queue can be formed inside the client. However, it is desirable to monitor the status of the print job of the print process which is performed in the server and client through one print queue, which simplifies job management and job operation in one print process.

When a client starts a print process in client side rendering, a job corresponding to the print process appears in the print queue. However, the print job disappears from the print queue just before the printer connected to the server makes a print-out. After a short interval, the print job corresponding to the print process reappears in the print queue, and the printer connected to the server makes the print-out. Since rendering is performed in the client, the job temporarily disappears from the print queue during the period in which a process is not performed in either the client or the server such as transfer of the print data from the client to the server.

Client side rendering will be described in detail below by referring to FIG. 7.

Moreover, a job ID of a print job that appears for the first time on the print queue and a job ID of a print job which appears for the second time are different. A job ID, which is an identifier for identifying a print job, is assigned to the target job by a print system or an operating system. The job ID is assigned to the target job together with job information such as a document name and an owner name. The job ID can be obtained together with the job information. Based on the job ID, the target job can be uniquely identified from a plurality of jobs in the print queue. Additionally, job information in the present invention includes information about the apparatus which issued the print job, information about the apparatus performing the process according to the print job, and information about the print setting or error status.

Therefore, in the client side rendering, the print job disappears once from a print queue, during which the print job cannot be monitored. Moreover, the print job ID which is assigned to a print job issued by a client at print start is different from the job ID which is assigned to the same print job by the server after the print job temporarily disappears from the print queue when print data is transferred to the server. Consequently, conventional methods for determining a print status or completion of a print process based on the existence of a print job in the print queue and the operation status of the printer fail in such cases.

For example, a print monitoring system which automatically stops monitoring of a print queue performed by the status monitor when printing is completed, can stop monitoring at an inappropriate timing. Furthermore, a charging system which charges a fee after confirming print completion can improperly count up a number of prints. Moreover, a distributed processing system utilizing a plurality of printers can distribute a job inappropriately to a printer which is still making a print-out.

For the purpose of preventing a print job from temporarily disappearing from the print queue, a method is devised in which a print job corresponding to print data in a client is not reflected in the print queue. However, in such a case, the job in the print queue cannot be managed after the print starts until the print data reaches the server. Therefore, the method has drawbacks in that monitoring cannot be performed during such a period so that the start of the print process cannot be detected or the user cannot cancel printing.

SUMMARY OF THE INVENTION

The present invention is directed to a method which flexibly monitors print completion and the status of a print process in a print system which includes an operating system that performs print process control in a client such as rendering.

According to an aspect of the present invention, a method in an information processing apparatus which monitors a job based on a print request from a client computer includes obtaining information about a job which exists in a print queue, continuing monitoring a print queue based on the obtained information even if a client job which appears at the print queue corresponding to a print process of the print job in the client process disappears from the print queue, and stopping monitoring the print queue if a server job corresponding to a print process in a server computer disappears from the print queue.

Further features and aspects of the present invention will become apparent from the following detailed description of embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 1 is a block diagram illustrating a network configuration and a software configuration of a print system according to an embodiment in the present invention.

FIG. 2A illustrates a case where the status monitor detects existence of a client job through a first communication, FIG. 2B illustrates a case where the status monitor detects a state where there is no job in the print queue before a server job appears, and FIG. 2C illustrates a case where the status monitor detects existence of a server job through the first communication.

FIG. 3 is a flowchart illustrating a process performed by a control program in a client when a status monitor monitors the status of a print queue according to a first embodiment of the present invention.

FIG. 4 is a flowchart illustrating a process performed by a control program in a client when a status monitor monitors the status of a print queue according to a second embodiment of the present invention.

DETAILED DESCRIPTION OF THE EMBODIMENTS

Various embodiments of the invention will be described in detail below with reference to the drawings.

In the embodiments of the present invention, a job which first appears in a print queue in response to a print instruction and ends without making a print with a printer, will be referred to as a client job. Moreover, a job which reappears in a print queue and is printed by a printer will be referred to as a server job.

First Embodiment

Figure 8:
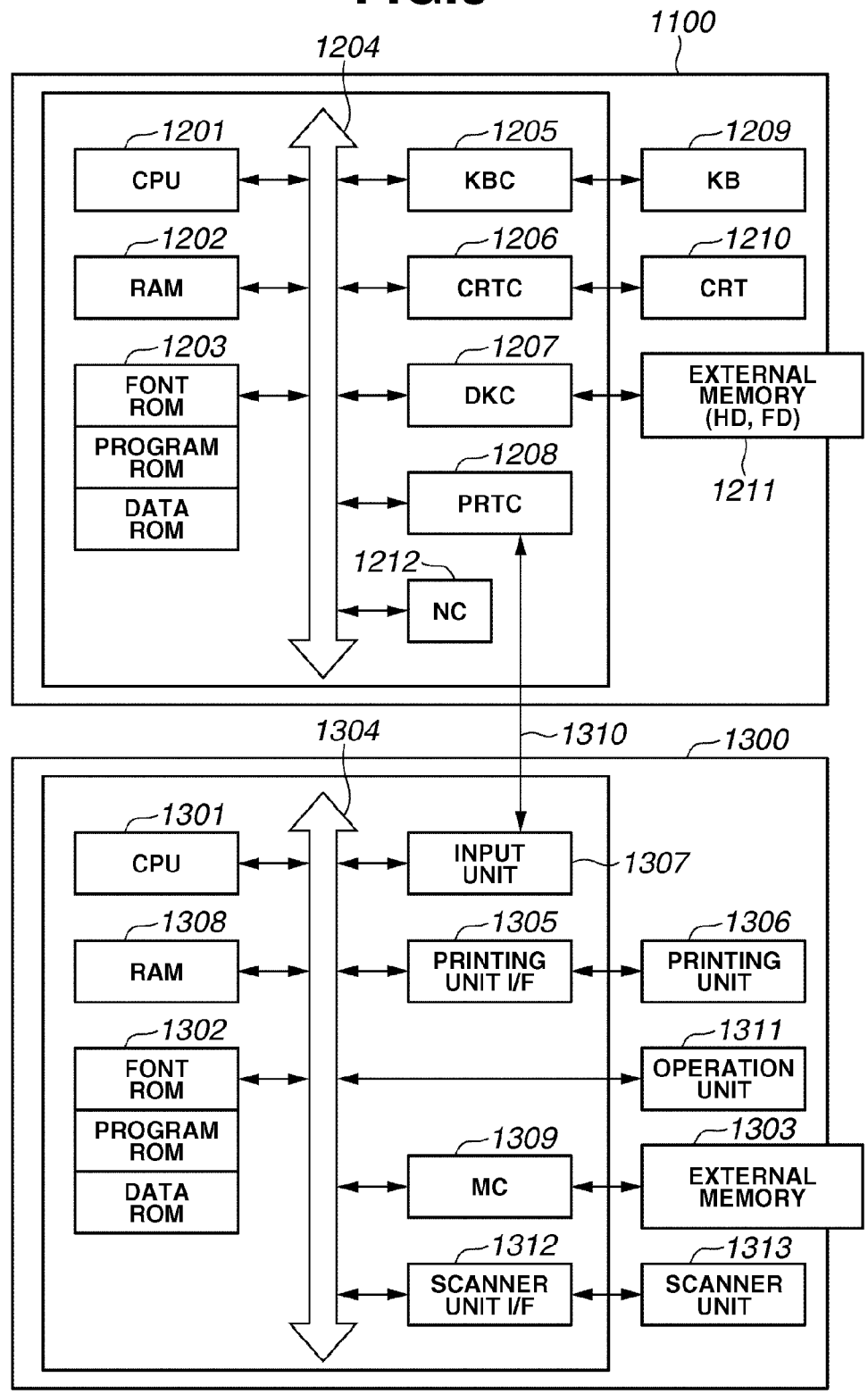
FIG. 8 is a block diagram illustrating a hardware configuration of a personal computer and an image-forming apparatus that are applicable to an embodiment in the present invention.

FIG. 8 illustrates an information processing apparatus in the form of a computer 1100 connected to an image-forming apparatus in the form of a printer 1300 through a network. The computer 1100 and the image-forming apparatus 1300 can communicate with each other.

The configuration of the computer 1100 will be described below. FIG. 8 illustrates a hardware configuration of a typical information-processing apparatus used in embodiments of the present invention. A client 151 and a server 152 shown in FIG. 1 have the same hardware configuration as the computer 1100. A printer 109 shown in FIG. 1 has the same hardware configuration as the image-forming apparatus 1300.

In FIG. 8, a central processing unit (CPU) 1201 runs a program such as an operating system (OS) or an application. The programs is stored in a program read-only memory (ROM) inside a ROM 1203 or loaded from a hard disk 1211 onto a random access memory (RAM) 1202. The processes illustrated in each of the flowcharts as described below are realized by running such a program. The RAM 1202 functions as a main memory of the CPU 1201 or a work area. A keyboard controller (KBC) 1205 controls key input from a keyboard 1209 or a pointing device (not shown). A cathode ray tube-controller (CRTC) 1206 controls displaying on a cathode ray tube (CRT) display 1210. A disk controller (DKC) 1207 controls data access in a hard disk (HD) 1211 and a floppy disk (FD) that store various data. A printer controller (PRTC) 1208 controls the exchange of signals between the computer 1100 and the image-forming apparatus 1300 connected to the computer 1100. A network controller (NC) 1212 is connected to a network and controls the communication with other devices that are connected to the network.

The image-forming apparatus 1300 will be described below. As illustrated in FIG. 8, a CPU 1301 controls each block that is connected to a system bus 1304 based on control programs stored in a ROM 1302 or an external memory 1303. An image signal generated by CPU 1301 is output as output information to a printing unit (or an image-forming apparatus engine) 1306 through a printing unit interface (I/F) 1305. Additionally, the CPU 1301 can communicate with the computer 1100 through an input unit 1307 and can notify the computer 1100 of information inside the image-forming apparatus 1300.

The program ROM inside the ROM 1302 stores control programs of the CPU 1301. The font ROM inside the ROM 1302 stores font data which is used in generating output information. The data ROM in the ROM 1302 stores information that is used in the host computer 1100 when the image-forming apparatus 1300 is not equipped with an external memory 1303 such as a hard disk.

A RAM 1308 functions as a main memory of the CPU 1301 or a work area. The amount of memory of the RAM 1308 can be increased by adding an optional RAM which can be connected to an expanded port (not shown). Furthermore, the RAM 1308 is used as output information expanding area, environment data storage area, and nonvolatile RAM (NVRAM).

A memory controller (MC) 1309 controls access to the external memory 1303. The external memory 1303 is connected as an option and stores font data, an emulation program, and form data. An operation unit 1311 includes switches/controls used in operating the apparatus and light emitting diode (LED) indicators.

A scanner I/F 1312 corrects, processes, and edits image data which is received from a scanner unit 1313. The scanner unit 1313 scans an image of an original with light and projects the obtained reflected light into a charge-coupled device (CCD) to convert image information into an electric signal. Furthermore, the electric signal is converted into red (R), green (G), and blue (B) luminance signals which are loaded as image data. When a user instructs the image-forming apparatus 1300 from the operation unit 1311 to start reading image data from the original, the instruction is sent to the scanner unit 1313. The scanner unit 1313 then reads the original. The original can be read by an auto-feeding method in which the original is set on an original feeder (not shown). Alternatively, the original can also be scanned by placing the original on a glass surface (not shown) and moving the exposure unit.

The image-forming apparatus 1300 illustrated in FIG. 8 according to the present embodiment includes a scanner unit and a scanner interface. However, the present invention can be embodied in any image-forming apparatus that can make a print based on print data received from a client, such as a consumer inkjet printer which does not include a scanner unit.

FIG. 1 is a block diagram illustrating a software configuration of a print system embodying the present invention.

FIG. 1 illustrates the client 151 and the server 152 which are connected to a printer in a network environment. In FIG. 1, the modules inside the client 151 are mainly related to a printer driver. More particularly, the printer driver in the present embodiment includes a user interface (UI) driver 103, a graphics driver 106, and a status monitor 110. Additionally, the present embodiment can also include a print processor 105 that forms part of the printer driver.

In the client 151, an application 101 creates a document and inquires of the UI driver 103 about the function of the print system in order to print the created document. The application 101 then instructs the print system to start printing. The print system includes a graphical device interface (GDI) 102 as the operating system. Upon receiving the print start instruction from the application 101, the GDI 102 notifies the UI driver 103 of a print event (i.e., print start) performed by the application 101.

The application 101 then supplies print data of the document to be printed to the GDI 102 and continues the print process.

A spool file 104 stores the print data received from the GDI 102 via a spooler 112.

A print processor 105 reads out the print data from the spool file 104 and transfers the print data to the server 152 via the graphics driver 106.

The print data transferred to the server 152 is temporarily stored in a spool file 107 via a spooler 113 and is sent to a language monitor 108. The language monitor 108 communicates bi-directionally with the printer 109 and sends the print data to the printer 109.

Moreover, the language monitor 108 informs a status monitor 110 about the present status of the printer or of the printing process based on the information received from the printer or print data sent to the printer. The status monitor 110 then displays the received status of the printer.

Furthermore, the status monitor 110 monitors a print queue 111 which is shared by the client 151 and the server 152 and obtains information about whether a print job exists and the status of the print job.

A status monitor in a consumer printer such as an inkjet printer is included in the operating system in view of operability. Furthermore, it is effective for a status monitor to oversee a specific printer and the print queue of the specific printer during the period when printing is performed. That is, the status monitor does not continuously monitor a plurality of printers regardless of whether or not a print process exists.

The status monitor as described above is activated when printing is started in the specific printer. The status monitor oversees only the print job retained in the print queue and ends the status monitor function when there is no print job in the print queue.

Figure 7:
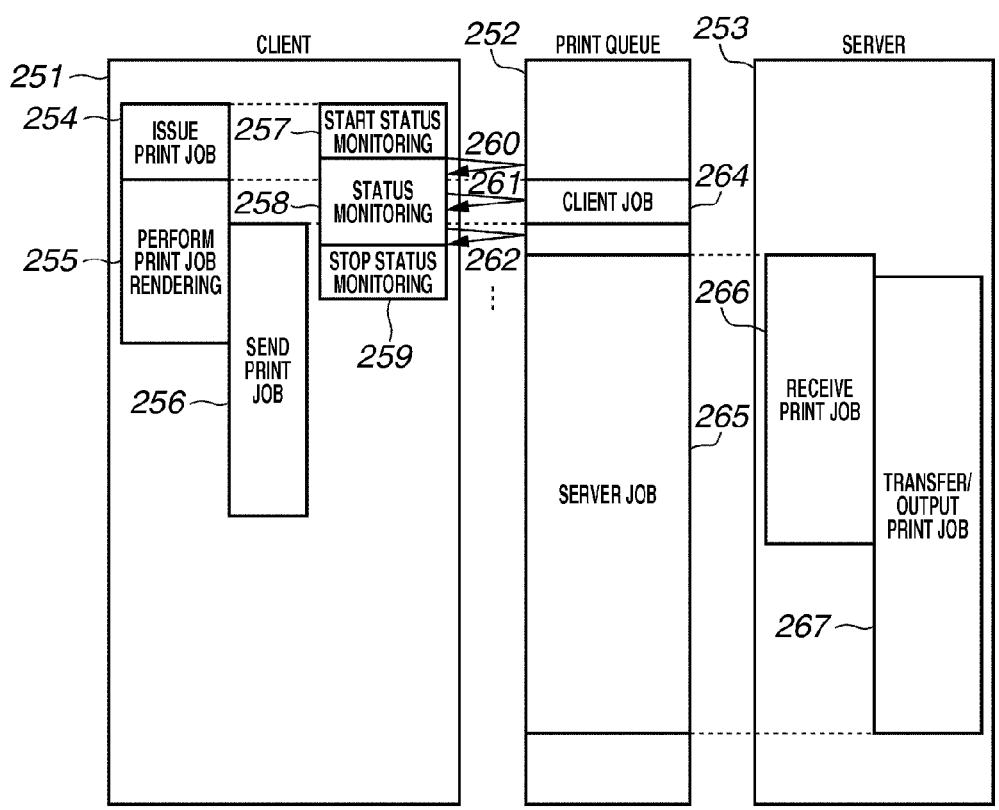
FIG. 7 illustrates the relation between the processes in a server and a client, a print queue, and a status monitor in a print system that performs client side rendering to which a conventional monitoring method using a status monitor is applied.

FIG. 7 illustrates the process of a status monitor in a client when client side rendering is performed according to a conventional method of monitoring a print queue. Additionally, FIG. 7 illustrates the relation between the print processes in the server and the client, and the job within the print queue which is shared by the server and the client. FIG. 7 illustrates progress in time from the upper part to the lower part of the diagram.

In the embodiment described below, a job which exists in a print queue will be referred to as a client job or a server job. The client job is a print job which appears in the print queue while a process such as rendering is performed in the client according to the print job issued by a client. The server job is a print job which appears in the print queue while a process is performed in a server according to the print job received from a client. Additionally, the print job which exists in the print queue includes job information which is used by a status monitor to determine whether a job is a client job or a server job.

The problem in the conventional method of monitoring a print queue will be described in detail by referring to FIG. 7.

The print process performed in the client 251 and the server 253, and the print job status in the print queue 252 according to the print process will be described first.

In the client 251, a given application issues a print job in step 254.

In step 255, a printer driver (or the graphics driver 106) performs a process such as rendering on the print job issued in step 254 and generates print data. A client job 264 appears in a print queue 202 while the rendering process is performed in the client.

In step 256, the generated print data is sent to the server 253. The client job 264 which appeared in the print queue 252 disappears as step 256 starts sending the print job.

On the other hand, the server 253 starts receiving a print job sent by the client 251 in step 266. At the same time, a server job 265 appears in the print queue 252.

In step 267, the server 253 performs printing according to the print job received in step 266, i.e., the server 253 transfers data to the printer.

The server 253 remains in the state of print job execution, i.e., in step 267, until the printer completes the print process. The server job 265 disappears from the print queue 252 when the state of print job execution 267 ends.

The monitoring of the print queue 252 by the status monitor 110 in a system which performs the above-described client side rendering will be described below.

When the client 251 issues a print job in step 254, a UI driver 103 activates the status monitor 110 in step 257. The instruction to activate the status monitor 110 can be given by any of the printer driver modules.

After the activation in step 257 ends, the status monitor 110 shifts to a status monitoring phase 258. The status monitor 110 then starts to communicate with the print queue 252 which is shared by the server 253 and the client 251. Consequently, the status monitor obtains information about whether a print job exists in the print queue 252.

The status monitor 110 which is in the status monitoring phase 258 and continues to communicate with the print queue 252, performs communications 260, 261, and 262 to monitor the print queue 252.

Through communication 261, the status monitor 110 obtains information that a print job (or a client job) exists in the print queue 252. The status monitor 110 then obtains information through communication 262 that the print job disappeared, and the status monitor 110 stops monitoring.

However, a server job 265 later appears in the print queue 252 as illustrated in FIG. 7. According to the conventional monitoring method, the server job cannot be monitored, and the status monitor 110 stops monitoring.

The reason for the above-described behavior in client side rendering will be described below.

When the client starts a print process, rendering is performed inside the client and a print job is generated. Moreover, when the print data reaches the server, a print job based on the received data is also generated in the server.

However, as described before, there are print systems in which a print queue is monitored as shared by a client and server. Therefore, when a client gives a print instruction, two separate print jobs appear in the print queue based on print data which is rendered in the client and print data which reaches the server.

To solve the above problem, control can be performed so that the print job corresponding to the print data in the client is not reflected in the print queue when data rendered by the graphics driver 106 starts to be transferred to the server. The rendering can be performed by any of the modules in the printer driver. In addition, the operation system or an application can instruct client side rendering. Moreover, the printer driver itself can instruct client side rendering based on information of the client or the operation system.

The above-described control corresponds to the temporary disappearance of a job from a print queue which was mentioned before. As a result, two print jobs that correspond to one print instruction are prevented from existing in the same print queue.

However, in the above-described control, a print job does not exist in the print queue from when the client starts to transfer print data to the server, to when the server receives the print data and generates a print job.

Figure 2A:
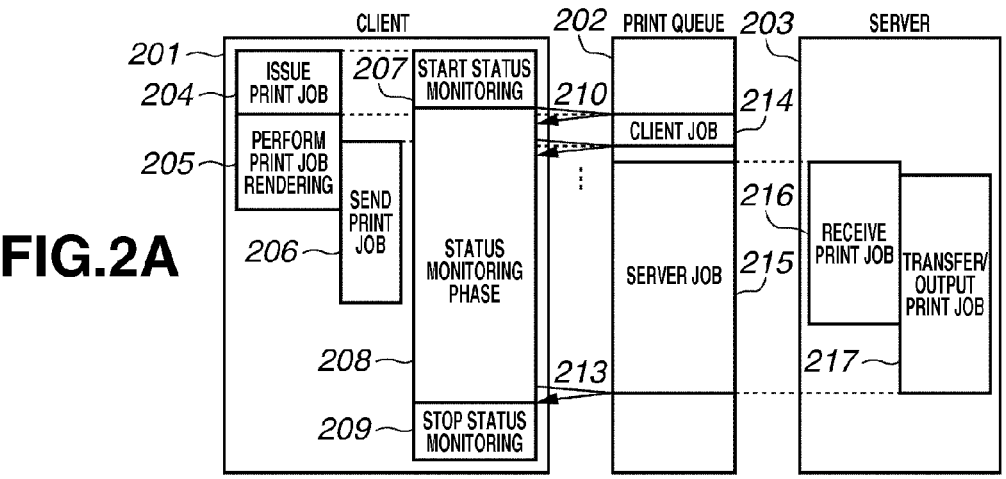
FIGS. 2A, 2B, and 2C illustrate the relation between the processes in a server and a client, a print queue, and a status monitor according to an embodiment in the present invention.
Figure 2B:
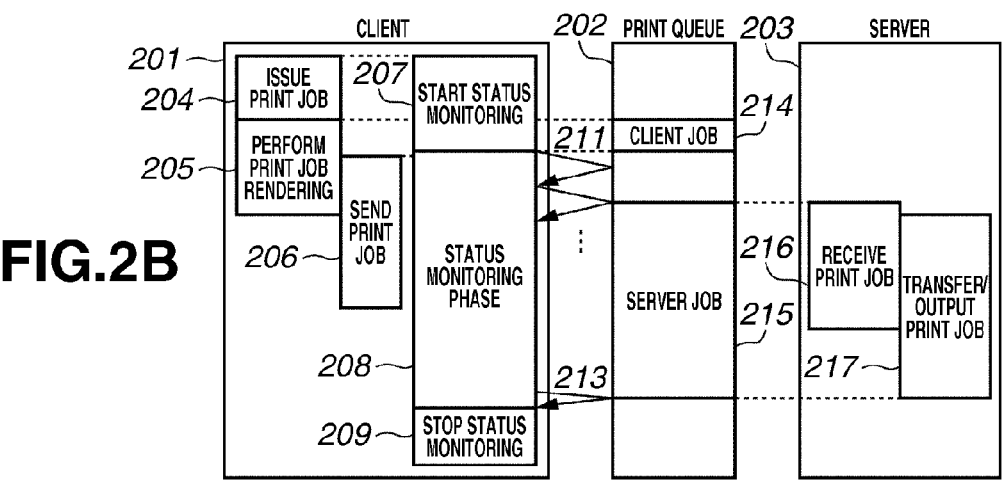
Figure 2C:
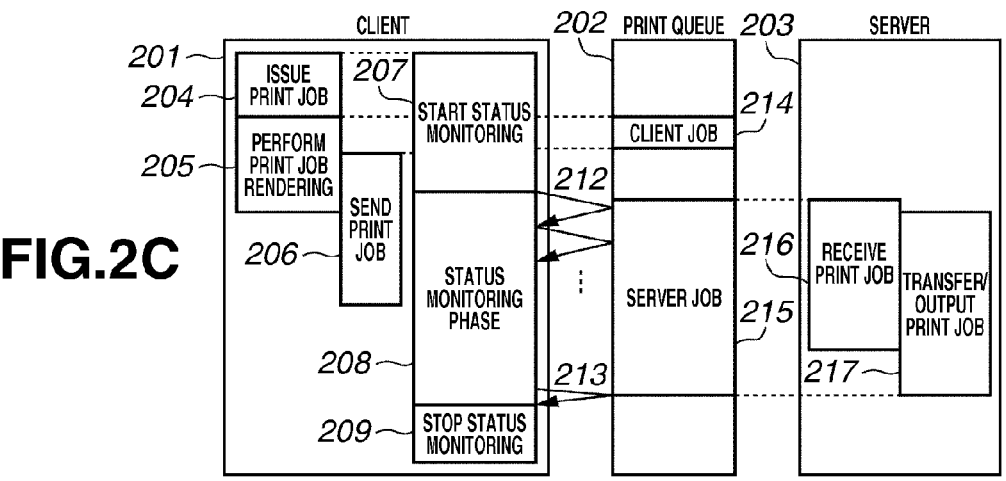

FIGS. 2A, 2B, and 2C illustrate a relation among the print processes in a server and a client, the job within a print queue which is shared by the server and client, and the status monitor in the client, in a print system embodying the present invention. Each figure illustrates progress in time from the upper part to the lower part of the diagrams.

The processes in common in FIGS. 2A, 2B, and 2C will be described first.

Client 201 issues a print job from a given application in step 204. The UI driver 103 activates the status monitor 110 in step 207.

When the activation of the status monitor in step 207 ends, the status monitor 110 shifts to a status monitoring phase 208. The status monitor then starts to perform communication with the print queue 202 which is shared by a server 203 and the client 201. Through such communication, the status monitor 110 obtains information about whether a print job exists in the print queue 202.

In step 205, the graphics driver 106 renders the print job issued in step 204 and generates print data. In accordance with the rendering process, a client job 214 appears in the print queue 202.

As the client 201 starts sending the print job to the server 203 in step 206, the client job 214 which appeared in the print queue 202 disappears.

In step 216, the server 203 starts receiving the print job sent from the client 201. At the same time, a server job 215 appears in the print queue 202.

In step 217, the server 203 performs the print process according to the print job received in step 216. That is, the server 203 transfers the data to the printer.

The server 203 remains in the state of the print job execution (i.e., step 217) until the printing is completed in the printer. When the printing is completed, the status of print job execution 217 ends and the server job 215 disappears from the print queue 202.

The status monitor 110 which is in a status monitoring phase 208 and continuing communication with the print queue 202 performs communication 213 to monitor the print queue 202. At this time, if the status monitor 110 detects that the job has completely disappeared from the print queue 202, the client 201 stops the operation of the status monitor 110 in step 209.

The differences between FIGS. 2A, 2B, and 2C will be described below. After activation, the status monitor 110 shifts to the status monitoring state 208 in all of FIGS. 2A, 2B, and 2C. The status of the print queue 202 is different in FIGS. 2A, 2B, and 2C when the status monitor 110 communicates with the print queue 202 to perform the initial print queue monitoring. The difference comes mainly from the different time required to activate the status monitor 110 depending on the processing status of the computer. Moreover, the time required in generating a print job or transferring data between the client and the server differs depending on the size of the print job or the size of data sent from the client.

More particularly, in FIG. 2A, the status monitor 110 shifts to a status monitoring phase 208. The status monitor 110 then performs the first communication 210 to monitor the print queue 202 and detects that a client job 214 exists in the print queue 202.

In FIG. 2B, the status monitor 110 shifts to a status monitoring phase 208. The status monitor 110 then performs the first communication 211 to monitor the print queue 202 and detects that neither the client job 214 nor the server job 215 exists in the print queue 202.

In FIG. 2C, the status monitor 110 shifts to a status monitoring phase 208. The status monitor 110 then performs first communication 212 to monitor the print queue 202 and detects that a server job 215 exists in the print queue 202.

In FIGS. 2B and 2C, the status monitor 110 obtains a job ID from the server 203 after the print job is transferred to the server 203. As described before, the job ID of a job issued in a client and the job ID of a job issued in a server are different in client side rendering. However, in the case where the print job to be monitored is identified using the job ID, the print job can be appropriately monitored by the status monitor which inquires in advance of the server about the job ID of the server job which is to be monitored.

The process of correctly monitoring a job regardless of the difference in the status of the print queue 202 in FIGS. 2A, 2B, and 2C will be described in detail by referring to the flowchart in FIG. 3.

FIG. 3 is an example of a flowchart based on a control program of a process which is performed in the client 201 when the status monitor 110 oversees the status of the print queue 202. The control program is read and executed by the CPU 1201 and is generally stored in the ROM 1203 or the HD 1211.

In step 301, the CPU 1201 obtains job information in the print queue 202.

In step 302, the CPU 1201 determines whether a job exists in the print queue 202 based on the information obtained in step 301. If the CPU 1201 determines that a job does not exist in the print queue 202 (NO in step 302), the process proceeds to step 303. If the CPU 1201 determines that a job exists in the print queue 202 (YES in step 302), the process proceeds to step 304. In step 304, the status monitor 110 obtains, analyzes, and displays job information and printer status, and continues the processes while the job exists. The job does not exist in the print queue 202 when the status monitor 110 starts monitoring at the timing of performing communication 211 with the print queue 202 as illustrated in FIG. 2B.

In step 303, the CPU 1201 determines whether job information and job ID of a job which is to be transferred to the server 203 exists in the print queue 202 when the job itself does not exist in the print queue 202. If the CPU 1201 determines that the job information and the job ID to be transferred to the server 203 exist in the print queue 202 (YES in step 303), the process proceeds to step 305. If the CPU 1201 determines that the job information and the job ID to be transferred to the server 203 do not exist in the print queue 202 (NO in step 303), the CPU 1201 stops the status monitoring operation and thus the monitoring of the print queue 202.

In step 304, the CPU 1201 determines whether the job existing in the print queue 202 is a client job. If the CPU 1201 determines that the job information obtained in step 301 includes information which indicates that the job is a client job (YES in step 304), the process proceeds to step 305. This is the status illustrated in FIG. 2A. If CPU 1201 determines that the job information obtained in step 301 does not include information which indicates that the job is a client job (NO in step 304), the process proceeds to step 308. This is the status illustrated in FIG. 2C.

In step 305, the CPU 1201 obtains the job ID to be assigned to the job after the job is transferred to the server 203. The job ID is obtained from the spooler 113.

In step 306 and 307, the CPU 1201 waits for a print job which has the above job ID to appear in the print queue 202. The CPU 1201 detects the appearance of the job ID by polling the print queue 202 or by receiving an event notification from the system. After the CPU 1201 detects that the job having the above job ID appears in the print queue 202 (YES in step 307), the process proceeds to step 308.

In step 308, the CPU 1201 performs control so that the status monitor 110 performs the conventional process of a status monitor, i.e., obtain, analyze, and display the job information and printer status. The status monitor 110 continues to perform the process while a job exists in the print queue 202. In step 309, the CPU 1201 determines whether a job to be monitored still exists in the print queue 202. If the CPU 1201 determines that the job to be monitored does not exist in the print queue 202 (NO in step 309), the process returns to step 302, and the same processing is repeated for other jobs.

In the present embodiment, while the status monitor 110 is active and monitoring the print queue 202, the error status or the processing status of the print job can be notified to a user through the CRT 1210 of the client. Consequently, the present embodiment can provide the user with a notification function which notifies the status of the print process which the user has instructed. Additionally, the present embodiment can provide a user with a job canceling function by which the user can cancel printing in progress, on a UI display. Moreover, the present embodiment can continue to consistently notify the user of the instructed print job and provide the user with the above job canceling function even if the print job temporarily disappears from the print queue due to client side rendering.

Conventionally, job monitoring is started after confirming that the job exists in the print queue. However, if the job to be monitored is a client job, the job monitoring is incorrectly stopped when the job disappears after a short time. On the other hand, a system according to the present embodiment can detect that a server job based on the print job according to a print instruction appears in a print queue after the client job disappears. Therefore, the system can continue to correctly monitor the status of the print queue. That is, a print system which uses an operating system that controls client side rendering can also flexibly monitor print completion and the printing progress.

Moreover, a system according to the present embodiment can detect that a server job appears in a print queue when monitoring is started while a job does not exist in the print queue, i.e., after a client job disappears until the server job appears. Therefore, monitoring can be continued correctly.

Furthermore, in a system according to the present embodiment, a client job can be associated with a server job ID while the client job exists in the print queue. Therefore, the client job and the server job can be shown to the user as if they are the same job, and user operation on the job such as print canceling can be accepted. Additionally, a client job can be associated with the job ID which brings about minimum error by confirming that information such as the document name or the owner of each of the print jobs are the same.

The present embodiment can be applied to a system in a local environment in addition to a network environment. In such a case, although information indicating a client or an ID assigned to the server job will not be obtained, in the flow described in the present embodiment, the expected monitoring operation according to the present invention can be achieved also in a local environment.

A case will be described below where a client makes a plurality of print requests, by referring to FIGS. 2A, 2B, and 2C. When in step 204 a print job is issued (first print job) in the client 201, the status monitor 110 is activated in step 207. Before the status monitor 110 stops monitoring in step 209, a print job (second print job) is newly issued from the client 201. As a result, for example, a client job according to the first print job appears first in the actual print queue 202, followed by the client job according to the second print job, the server job according to the first print job, and the server job according to the second print job.

The status monitor 110 is not newly activated when a second print job is issued. Instead, the status monitor 110 which is currently in operation continues to monitor the print queue. Additionally, the status monitor 110 can refer to the information on the second print job that is managed by the client 201.

When the server job according to the first print job disappears from the print queue 202 at the above-described timing, the CPU 1201 performs the process of step 303 described in FIG. 3. The status monitor 110 then detects the server job according to the second print job. As a result, the present embodiment can prevent the status monitor 110 from stopping monitoring of the print queue when there is a print job which needs to be monitored. Moreover, according to the present embodiment, a plurality of status monitors cannot be activated simultaneously in the client.

A case will be described below where a plurality of clients makes a print request to a server. In such a case, by the first client and the second client, print job information is reflected in the same print queue. The status monitor 110 in the first client oversees the print job issued from the first client. The above example will be described in detail by referring to FIGS. 2A, 2B, and 2C. A client job (1) from the first client and a client job (2) from the second client appear in the print queue 202. Subsequently, it is assumed that a server job (3) based on the client job (1) from the first client and a server job (4) based on the client job (2) from the second client appear in the print queue 202 in this order. The status monitor 110 in the first client desires to stop monitoring when the server job (3) based on the client job from the first client disappears from the print queue 202. However, the server job (4) based on the client job from the second client is in process, or a job does not exist in a print queue 202. Consequently, the status monitor 110 inquires of the server about job information as described in step 303 and determines that there is still a job so that the status monitor 110 can continue monitoring. Therefore, the status monitor 110 monitors the print job issued from the client of the status monitor 110. Moreover, the status monitor 110 can stop monitoring if job information obtained from a print queue or a server does not relate to a job to be monitored.

Furthermore, when a status monitor is monitoring the print queue while a client job or a server job is standing by to appear in the print queue, a print job may not appear in the print queue if a user cancels the print process or an error occurs. In consideration of such a case, the status monitor is automatically turned off when a print job does not appear in the print queue in a given period of time.

Second Embodiment

The present invention is not limited to a system in which a status monitor oversees an unspecified number of print jobs as described in the first embodiment. The present invention can also be applied to a system which monitors a specific job.

An embodiment according to the present invention in an application which generates pay-based print data will be described as an example using the flowchart illustrated in FIG. 4.

In step 400, the CPU 1201 issues a job based on pay-based print data in which a fee is charged when printing is completed. In step 401, the CPU 1201 obtains from the operating system a job ID corresponding to the issued job.

In step 402, the CPU 1201 determines whether a job which is assigned the above job ID exists in the print queue. If the CPU 1201 determines that the job does not exist in the print queue (NO in step 402), the process ends. If the CPU 1201 determines that the job exists in the print queue (YES in step 402), the process proceeds to step 403.

In step 403, the CPU 1201 determines whether the job which exists in the print queue is a client job. If the CPU 1201 determines that the job is a client job (YES in step 403), the process proceeds to step 404. If the CPU 1201 determines that the job is not a client job (NO in step 403), the process proceeds to step 407.

In step 404, the CPU 1201 obtains a server job ID assigned to the job after the job is transferred to the server. In step 405, the CPU 1201 waits until the job having the above server job ID appears in the print queue even when the job having the client job ID disappears from the print queue.

In step 406, the CPU 1201 determines whether a job having the server job ID appears in the print queue. If the CPU 1201 determines that the job appears in the print queue (YES in step 406), the process proceeds to step 407.

In step 407, the CPU 1201 performs job monitoring and obtains the printer status.

In step 408, the CPU 1201 determines whether a job to be monitored exists in the print queue. If the CPU 1201 determines that the job does not exist in the print queue (NO in step 408), the process proceeds to step 409. In step 409, the CPU 1201 determines whether there is a printer error or a canceling during the process based on the information monitored in step 407. If the CPU 1201 determines that printing is completed normally (NO in step 409), the process proceeds to step 410. In step 410, the fee to be charged is counted, and the process ends. If the CPU 1201 determines that printing is not completed normally (YES in step 409), the process ends without counting the fee.

In the present embodiment, while the status monitor 110 is active and monitoring the print queue 202, the error status or the processing status of the print job can be notified to a user through the CRT 1210 of the client. Consequently, the present embodiment can provide the user with a notification function which notifies the status of the print process which the user has instructed. Additionally, the present embodiment can provide a user with a job canceling function by which the user can cancel printing in progress, on a UI display. Moreover, the present embodiment can continue to consistently notify the user of the instructed print job and provide the user with the above job canceling function even if the print job temporarily disappears from the print queue due to client side rendering.

According to the present embodiment, the completion of a specific job can be appropriately monitored even in a network environment which includes an operating system that causes a job to temporarily disappear from the print queue, such as client side rendering.

The present embodiment can be applied to a system in a local environment instead of a network environment. In such a case, although information indicating a client job or a job ID to be assigned to the server job will not be obtained, in the flow described in the present embodiment, the expected monitoring operation according to the present invention can also be realized in a local environment.

Third Embodiment

The third embodiment of the present invention can also be applied to a system which only needs to determine whether a job exists in a print queue, unlike the operation of the status monitor in the first and second embodiments.

For example, a distributed print service monitors the operation status of a plurality of printers on a network and distributes a print job giving priority to a printer which is not operating. The present embodiment can be applied to a control process which sequentially monitors the print queue of the plurality of printers to confirm the operation status, and a print job is sent to the print queue in which a print job does not exist.

Figure 5:
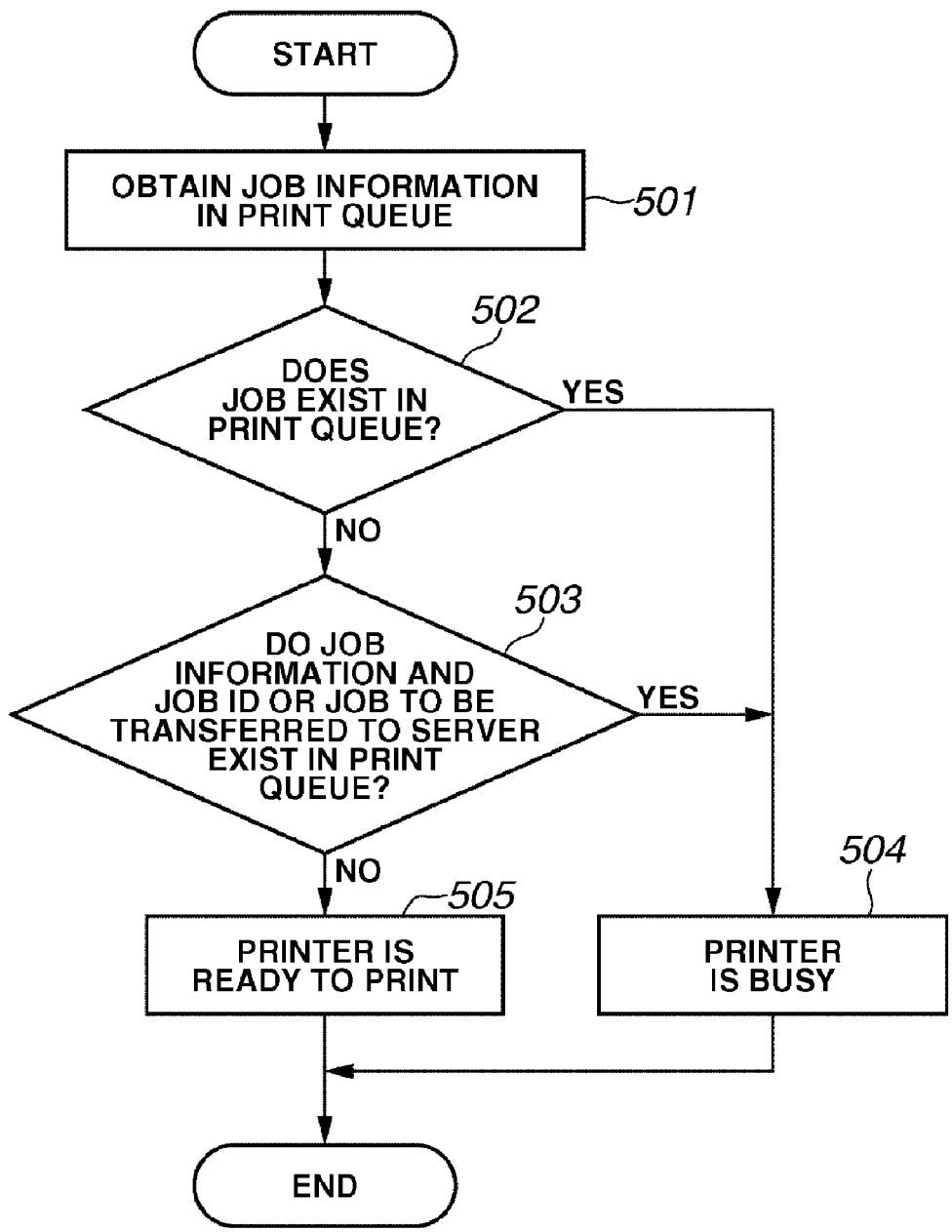
FIG. 5 is a flowchart illustrating a process performed by a control program in a client when a status monitor monitors the status of a print queue according to a third embodiment of the present invention.
Figure 6:
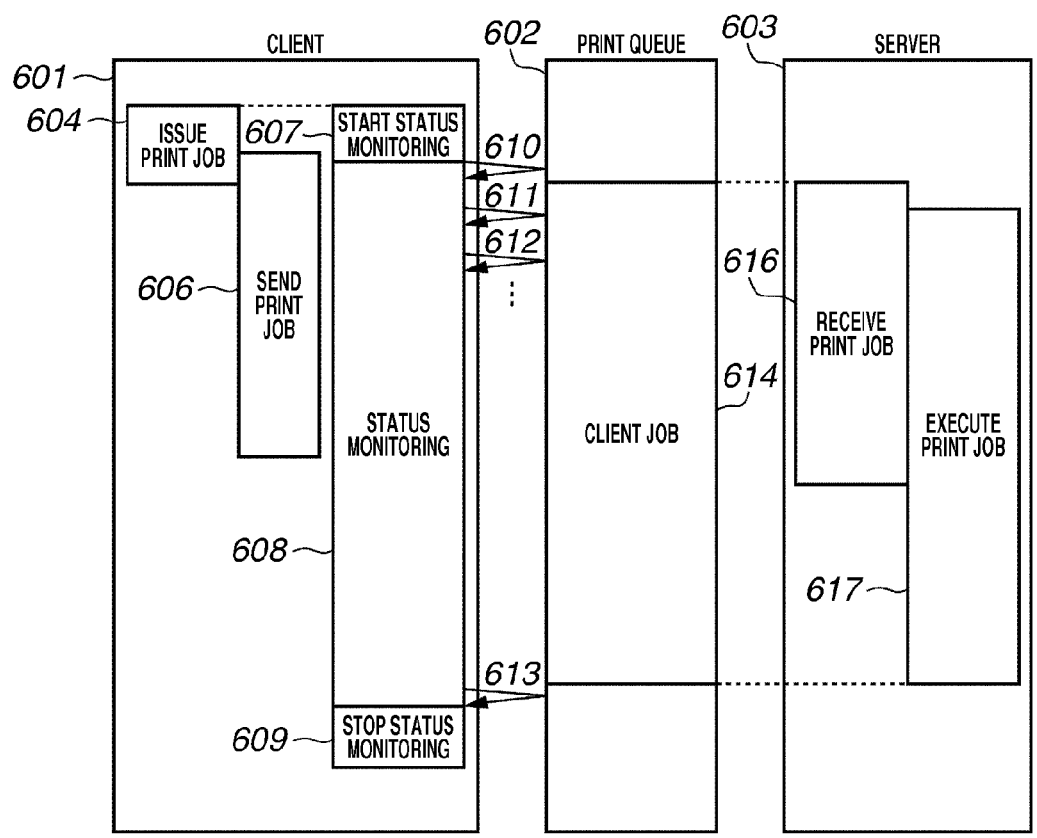
FIG. 6 illustrates the relation between the processes in a server and a client, a print queue, and a status monitor in a print system which does not perform client side rendering.

An example of a control flow in the case will be described using the flowchart in FIG. 5. FIG. 5 is a flowchart for determining the operation status of a printer, in the process of determining the operation statuses of a plurality of printers on a network. In step 501, the CPU 1201 obtains job information in a print queue. In step 502, the CPU 1201 determines whether a job exists in the print queue. If the CPU 1201 determines that a job exists in the print queue (YES in step 502), the process proceeds to step 504. In step 504, the CPU 1201 determines that the printer is busy. A determining step can also be added to the flow in which the CPU 1201 determines the status of a job, and if the printer is in the status equivalent to not operating, such as in a pending state, the CPU 1201 determines that a job does not exist in the print queue. On the other hand, if the CPU 1201 determines that a job does not exist in the print queue (NO in step 502), the process proceeds to step 503. In step 503, the CPU 1201 determines whether job information and job ID to be transferred to the server exist in the print queue while a job does not exist. If the CPU 1201 determines that the job information and the job ID exist in the print queue (YES in step 503), the process proceeds to step 504. In step 504, the CPU 1201 determines that the printer is busy. If the CPU 1201 determines that the job information and the job ID do not exist in the print queue (NO in step 503), the process proceeds to step 505. In step 505, the CPU 1201 determines that the printer is ready to make a print. The above flow is performed sequentially on the printers that are to be monitored on the network.

In the present embodiment, while the status monitor 110 is active and monitoring the print queue 202, the error status or the processing status of the print job can be notified to a user through the display such as the CRT 1210 of the client. Consequently, the present embodiment can provide the user with a notification function which notifies the status of the print process which the user has instructed. Additionally, the present embodiment can provide a user with a job canceling function by which the user can cancel printing in progress, on a UI display. Moreover, the present embodiment can continue to consistently notify the user of the instructed print job and provide the user with the above job canceling function if the print job temporarily disappears from the print queue due to client side rendering.

According to the present embodiment, an appropriate job monitoring can be performed in a system which requires information about whether an incomplete job of a print process exists in a print queue. The above job monitoring can be performed in a network environment that includes an operating system which performs control so that a job temporarily disappears from the print queue.

The system according to the present embodiment can be applied to both a local environment in which a plurality of printers are connected, and an environment in which only a single printer exists.

In such a case, although information indicating that a job is a client job or a job ID to be assigned to the server job will not be obtained, in the flow described in the present embodiment, the expected monitoring operation according to the present invention can also be realized in a local environment.

According to the above-described embodiments of the present invention, when a client side rendering is performed, status monitoring is not incorrectly stopped during a print process. Therefore, a highly accurate status monitoring can be achieved. Moreover, the status monitor does not incorrectly determine print completion, which is relevant and necessary in a fee-charging system in which a fee is charged when the printing of fee-based print data is completed. Furthermore, the embodiments in the present invention deal with and exclude the case where an interval in which a print job does not exist in a print queue is incorrectly determined as not printing. Therefore, the embodiments are effective in a distributed printing service in which a print job is distributed by giving priority to a printer that is not operating on a network.

While the present invention has been described with reference to embodiments, it is to be understood that the invention is not limited to the disclosed embodiments. The scope of the following claims is to be accorded the broadest interpretation so as to encompass all modifications, equivalent structures, and functions.

This application claims priority from Japanese Patent Application No. 2006-288811 filed Oct. 24, 2006, which is hereby incorporated by reference herein in its entirety.

What is claimed is:

1. A client computer for monitoring a print queue that manages print jobs of a print system including the client computer and a server computer, the client computer comprising:
 a rendering unit configured to perform a rendering process on a print job;
 a client-job-information obtaining unit configured to obtain, from an operating system performed on the client computer, client-job information related to a client job corresponding to a print process including the rendering process performed on a specific print job based on data of a specific application by the client computer;
 a server-job-information obtaining unit configured to obtain, from the server computer, server-job information related to a server job corresponding to a print process performed on the specific print job by the server computer, wherein the server-job information is to be assigned after the specific print job is transferred to the server computer from the client computer;
 an identifying unit configured to identify whether a print job present in the print queue is the client job or the server job, by using the client-job information and the server-job information;
 a monitoring unit in the client computer configured to start monitoring the client job in the print queue corresponding to the specific print job and continue monitoring the print queue to determine if job ID and job information of the specific print job exists in the print queue after the client job identified by the identifying unit disappears from the print queue and no print job is present in the print queue, until a server-job corresponding to the specific print job corresponding to the disappeared client job appears in the print queue and is identified by the identifying unit and the server-job identified by the identifying unit disappears from the print queue; and
 a notifying unit configured to notify a user of a processing status related to the specific print job as a monitoring result by the monitoring unit,
 wherein, in a case where the server job corresponding to the specific print job identified by the identifying unit disappears from the print queue and no print job ID and information corresponding to the specific print job is present in the print queue, the monitoring unit terminates monitoring of the print queue, and
 wherein, in a case where no print job is present in the print queue and the server-job-information obtaining unit obtains the server-job information to be assigned to the server job, the notifying unit notifies the user that a printer that is to process the specific print job is busy as the monitoring result.

2. The client computer according to claim 1, wherein, based on completion of a print output process for the specific print job that the server computer has instructed an image-forming apparatus to perform, the server job disappears from the print queue.

3. An information-processing method, comprising:
 performing a rendering process on a print job;
 obtaining, from an operating system performed on a client computer, client-job information related to a client job corresponding to a print process including the rendering process performed on a specific print job based on data of a specific application by the client computer;
 obtaining, from a server computer, server-job information related to a server job corresponding to a print process performed on the specific print job by the server computer, wherein the server-job information is to be assigned after the specific print job is transferred to the server computer from the client computer;
 identifying whether a print job present in a print queue is the client job or the server job, by using the client-job information and the server-job information;
 start monitoring, in the client computer, the client job in the print queue corresponding to the specific print job and continue monitoring the print queue to determine if job ID and job information of the specific print job exists in the print queue after the identified client job disappears from the print queue and no print job is present in the print queue, until a server-job corresponding to the specific print job corresponding to the disappeared client job appears in the print queue and is identified and the identified server-job disappears from the print queue; and
 notifying a user of a processing status related to the specific print job as a monitoring result,
 wherein, in a case where the server job corresponding to the identified specific print job disappears from the print queue and no print job ID and information corresponding to the specific print job is present in the print queue, monitoring of the print queue is terminated, and
 wherein, in a case where no print job is present in the print queue and the server-job information to be assigned to the server job is obtained, the user is notified that a printer that is to process the specific print job is busy as the monitoring result.

4. A non-transitory computer-readable medium storing a program that causes a computer to perform a method, the method comprising:
 performing a rendering process on a print job;
 obtaining, from an operating system performed on a client computer, client-job information related to a client job corresponding to a print process including the rendering process performed on a specific print job based on data of a specific application by the client computer;
 obtaining, from a server computer, server-job information related to a server job corresponding to a print process performed on the specific print job by the server computer, wherein the server-job information is to be assigned after the specific print job is transferred to the server computer from the client computer;
 identifying whether a print job present in a print queue is the client job or the server job, by using the client-job information and the server-job information;
 start monitoring, in the client computer, the client job in the print queue corresponding to the specific print job and continue monitoring the print queue to determine if job ID and job information of the specific print job exists in the print queue after the identified client job disappears from the print queue and no print job is present in the print queue, until a server-job corresponding to the specific print job corresponding to the disappeared client job appears in the print queue and is identified and the identified server-job disappears from the print queue; and notifying a user of a processing status related to the specific print job as a monitoring result, wherein, in a case where the server job corresponding to the identified specific print job disappears from the print queue and no print job ID and information corresponding to the specific print job is present in the print queue, monitoring of the print queue is terminated, and wherein, in a case where no print job is present in the print queue and the server-job information to be assigned to the server job is obtained, the user is notified that a printer that is to process the specific print job is busy as the monitoring result.

* * * * *